United States Patent [19]

Kaminski et al.

[11] 4,236,087
[45] Nov. 25, 1980

[54] PROGRAMMABLE BUS DRIVER ISOLATION

[75] Inventors: David G. Kaminski, Eagan; David F. Grimm, Valley, both of Minn.

[73] Assignee: Sperry Corporation, New York, N.Y.

[21] Appl. No.: 956,017

[22] Filed: Oct. 30, 1978

[51] Int. Cl.³ .................. H03K 13/32; H03K 19/007; H03L 5/02
[52] U.S. Cl. ............................... 307/200 A; 307/203; 307/296 R
[58] Field of Search .............. 307/200 A, 203, 296 R

[56] References Cited

U.S. PATENT DOCUMENTS

| | | | |
|---|---|---|---|
| 3,562,555 | 2/1971 | Ahrons | 307/200 A |
| 3,725,675 | 4/1973 | Olsen | 307/200 A |
| 3,751,684 | 8/1973 | Struger | 307/200 A |
| 3,859,560 | 1/1975 | Peters | 307/200 A |

Primary Examiner—John S. Heyman
Attorney, Agent, or Firm—John L. Rooney; Kenneth T. Grace; Marshall M. Truex

[57] ABSTRACT

A method of and an apparatus for selectively isolating digital data bus drivers from digital data busses for fault recovery and diagnostic purposes. The digital data bus drivers may be either transistor-transistor logic (TTL) or emitter coupled logic (ECL). For TTL digital data bus drivers, the input voltage ($V_{CC}$) is supplied via a switching power transistor. For ECL digital data bus drivers, the ground connection ($V_{CC1}$) is made via a switching power transistor. In either case, the switching power transistor is turned on and off in response to one binary bit in an isolation register coupled to the power transistor via an open collector gate or electromechanical switch. By supplying the $V_{CC}$ (for TTL) or $V_{CC1}$ (for ECL) connection to each digital data bus driver through a switching power transistor and controlling each switching power transistor through a different binary bit in the isolation register, the isolation (or non-isolation) status of each digital data bus driver may be controlled via the isolation register to permit the digital data bus to operate notwithstanding failures effecting the state of one or more of the digital data bus drivers connected to it.

6 Claims, 2 Drawing Figures

PROGRAMMABLE BUS DRIVER ISOLATION

BACKGROUND OF THE INVENTION

This invention relates generally to digital electronic circuitry and more specifically to circuitry providing a way fo isolating digital data bus drivers from a digital data bus.

The design of present day digital systems involves greater utilization of digital data busses for information transfer. This has resulted from the economics associated with bussed rather than point-to-point interconnection architectures. Basically the bussed system uses a single electrical conduction medium (may be one or more conductors) which is timeshared to enable transmission of digital data from multiple sources to multiple destinations. This technique is in contrast to point-to-point interconnection which dedicates a single conduction medium to transfers from a single source to one or more destinations. As more and more functionally unrelated data sources timeshare a given digital data bus, the complexity of the timesharing protocol is increased. Furthermore, the probability that one of the multiple data sources will, because of malfunctions, interfere with the other users (i.e., data sources and data destinations) of the digital data bus also increases. In fact, a given data source may malfunction in such a way as to render the digital data bus totally useless to the other digital data bus users. This normally occurs because the malfunctioning data source attempts to transmit on the digital data bus at a time other than that which is assigned by the timesharing protocol. Such a malfunction may be observed as a "stuck-at" logic level (i.e., one or more conductors within the digital data bus having a constant logical level which does not change over time) or may be observed as intermittent improper signals on the digital data bus.

In either instance, it is desirable to electrically isolate the malfunctioning data source from the digital data bus to enable the other (non-malfunctioning) users of the digital data bus to utilize the digital data bus. Malfunctioning data sources may, of course, be isolated by physically disconnecting them from the digital data bus. This is undesirable because it is slow and may be inconvenient due to system packaging. Mechanical and electromechanical switches have been used but they tend to be unreliable, physically large, costly to implement, and slow to react. An alternative used on occasion is the use of solid state switches which are undesirable because they substantially change the electrical characteristics of the digital data bus. The present invention provides a way of providing the desired isolation without substantially changing the electrical characteristics of the digital data bus regardless of whether a given data source is or is not being isolated.

SUMMARY OF THE INVENTION

The present invention is applicable to digital data bus drivers of transistor-transistor logic (TTL) or emitter coupled logic (ECL). For TTL digital data bus drivers, the input collector voltage or $V_{CC}$ is supplied via a power switching transistor. The power switching transistor is turned off and on corresponding to the binary state of one bit in an isolation control register. When turned on, the power switching transistor supplies current to the $V_{CC}$ input of the TTL digital data bus driver causing it to operate normally. When the power switching transistor is turned off, no current is available to the TTL digital data bus driver which then becomes effectively isolated from the digital data bus for all malfunctions except for a short from its output circuit to ground.

For ECL digital data bus drivers, the ground connection, $V_{CC1}$, is made through a power switching transistor. The power switching transistor is turned off and on corresponding to the binary state of one bit in an isolation control register. When turned on, the power switching transistor completes the ground connection at $V_{CCI}$ of the ECL digital data bus driver causing it to operate normally. When the power switching transistor is turned off, the ECL digital data bus driver "floats" (i.e., has no conducting path) with respect to ground effectively isolating the ECL digital data bus driver from the digital data bus for all malfunctions except for a short to ground in the output (i.e., base or emitter) circuit.

By configuring each digital data bus driver as indicated above, the isolation status of each can be controlled by the contents of the isolation control register. The digital data bus may then be utilized notwithstanding malfunctions effecting one or more data sources by entering a binary bit pattern into the isolation control register which isolates those digital data bus drivers associated with the malfunction.

DETAILED DESCRIPTION OF THE PREFERRED EMBODIMENTS

The preferred embodiments discussed herein are a result of tests made to optimize the present invention for use in digital computer applications. Those skilled in the art will readily visualize those changes to circuit design parameters required to optimize the present invention for other applications.

EMITTER COUPLED LOGIC (ECL)

Figure 1:
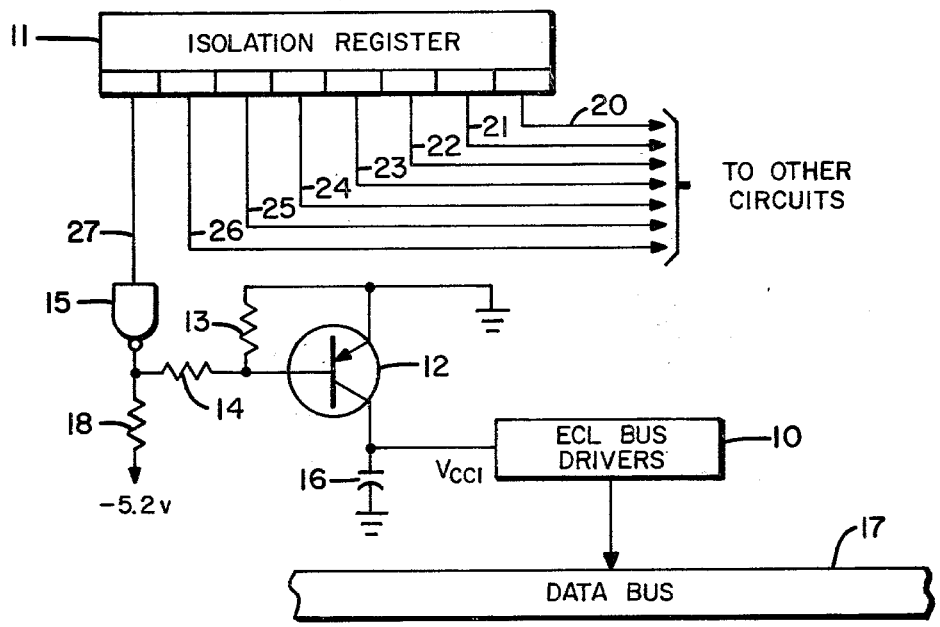
FIG. 1 illustrates the preferred embodiment for ECL digital data bus drivers.

FIG. 1 shows the present invention for use with ECL digital data bus drivers, ECL BUS DRIVERS 10. Typical of the devices used for ECL BUS DRIVERS 10 is Motorola Part N. MC10106, though those skilled in the art will readily recognize the applicability to other parts.

ECL BUS DRIVERS 10 are connected to the digital data bus, DATA BUS 17, as shown. Additional connections must be made to ECL BUS DRIVERS 10 which are not shown for clarity. The connection to ECL BUS DRIVERS 10 necessary to the present invention is made at $V_{CC1}$ (i.e., ground connection). The collector of power switching transistor 12 is connected at that point. Though other power switching transistors may be used, the invention was tested using a 2N3765. It is recommended that power switching transistor 12 be connected to one or more ECL BUS DRIVERS 10 to draw no more than 150 ma (milliamperes) of collector current. Capacitor 16 decouples the high frequency component as power switching transistor 12 is switched off. Capacitor 16 is on the order of 8,200 pf (picofarads). Resistor 13 is 80 ohms. Resistor 14 is 50 ohms. Resistor 18 is 200 ohms. Power switching transistor 12 is supplied with a negative 5.2 v (volts) as shown. NAND gate 15 merely inverts the signal received via line 27 for application to the base circuit of power switching transistor 12 through resistor 14. NAND gate 15 is a negative-going logic device, probably also ECL.

The isolation control register, ISOLATION REGISTER 11, is a rank of bistate devices wherein each bistate device stores one binary bit. Common monolithic devices are available for this purpose. Line 27 is shown as connecting one bit of ISOLATION REGISTER 11 to NAND gate 15. If the binary bit so connected via line 27 is at a state of high, NAND gate 15 applies a low to the interconnection of resistors 14 and 18. This causes the base of power switching transistor 12 to become a low, and power switching transistor 12 turns on, conducting between the $V_{CC1}$ connection of ECL BUS DRIVERS 10 and ground through the emitter and collector circuits of power switching transistor 12. If the binary bit of ISOLATION REGISTER 11 so connected via line 27 is at a state of low, NAND gate 15 applies a high to the interconnection of resistors 14 and 18. This causes the base of power switching transistor 12 to become a high, and power switching transistor 12 turns off, allowing the $V_{CC1}$ connection of ECL BUS DRIVERS 10 to float with respect to ground effectively isolating ECL BUS DRIVERS 10 from DATA BUS 17.

Lines 20, 21, 22, 23, 24, 25, and 26 conduct the binary states of other bits of ISOLATION REGISTER 11 to other power switching transistor circuits as shown. Of course, ISOLATION REGISTER 11 may have more or fewer than the eight bits shown enabling it to control a greater or lesser number of power switching transistor circuits. The input to ISOLATION REGISTER 11, not shown may be from devices which permit manual or automated determination of the contents of ISOLATION REGISTER 11 (and hence the isolation status of the ECL digital data bus drivers) depending upon the application.

TRANSISTOR-TRANSISTOR LOGIC (TTL)

Figure 2:
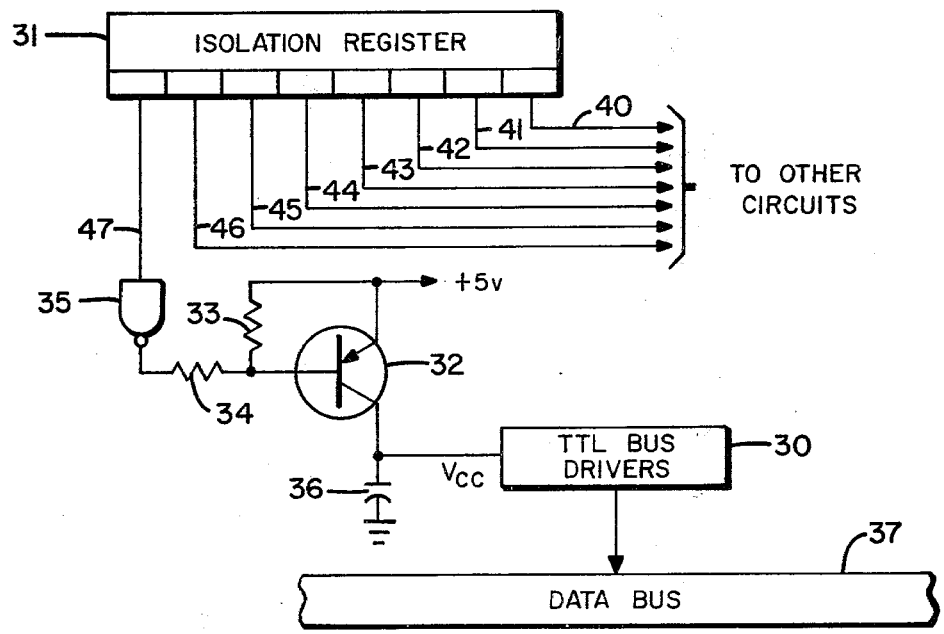
FIG. 2 illustrates the preferred embodiment for TTL digital data bus drivers.

FIG. 2 shows the similar circuit for the preferred embodiment using TTL digital data bus drivers, TTL BUS DRIVERS 30. Typical devices used for TTL BUS DRIVERS 30 are part types LS251, LS253, LS257 and LS258. Many common TTL device types may be used but they must be tri-state or open collector devices to be used with the present invention as TTL BUS DRIVERS 30.

TTL BUS DRIVERS 30 are connected to the digital data bus, DATA BUS 37, as shown. Additional connections must be made to TTL BUS DRIVERS 30 which are not shown for clarity. The connection to TTL BUS DRIVERS 30 necessary to the present invention is made at $V_{CC}$ (i.e., input power connection). The collector of power switching transistor 32 is connected at that point. A 2N3765 was used as the power switching transistor. Power switching transistor 32 may be connected to one or more TTL digital data bus drivers, but it is recommended that no more than 150 ma be supplied by one power switching transistor. Capacitor 36 is on the order of 8,200 pf and is intended to decouple high frequency transients generated as power switching transistor 32 is switched on and off. Resistor 33 is 1,000 ohms, and resistor 34 is 270 ohms. Power switching transistor 32 has a positive 5 volts applied to the emitter as shown. NAND gate 15 inverts the signal received via line 47 for application to the base of power switching transistor 32 via resistor 34. NAND gate 35 must be an "open collector" gate (i.e., contains no pull-up resistor in its collector circuit). This permits the output of NAND gate 35 to float with an input of low enabling resistor 33 to bias the base of power switching transistor 32.

The isolation control register, ISOLATION REGISTER 31, is a rank of bistate devices similar in construction and function to ISOLATION REGISTER 11, discussed above. Line 47 is shown as connecting one bit of ISOLATION REGISTER 31 to NAND gate 35. If the binary bit so connected via line 47 is at a state of high, NAND gate 35 applies a low to the base of power switching transistor 32 through resistor 34. This causes power switching transistor 32 to turn on, conducting current from the positive 5 volt source (+5 v) to the $V_{CC}$ connection of TTL BUS DRIVERS 30 through the emitter and collector of power switching transistor 32. If the binary bit of ISOLATION REGISTER 31 so connected via line 47 is at a state of low, the open collector circuit NAND gate 35 floats. The +5 v then causes the base of power switching transistor 32 to go high through resistor 33. This causes power switching transistor 12 to turn off, thereby interrupting the current source to the $V_{CC}$ connection of TTL BUS DRIVERS 30 and effectively isolating TTL BUS DRIVERS 30 from DATA BUS 37.

Lines 40, 41, 42, 43, 44, 45 and 46 conduct the binary states of other bits of ISOLATION REGISTER 31 to other power switching transistor circuits as shown. As with ISOLATION REGISTER 11, ISOLATION REGISTER 31 may have more or fewer than eight bits and may have manual or automatic inputs.

What is claimed is:

1. A digital data bus driver circuit comprising:
    an ECL tri-state bus driver;
    a power transistor having a first electrode coupled to a ground connection of said ECL tri-state bus driver and having a second electrode coupled to ground;
    means responsively coupled to said power transistor for biasing said power transistor whereby said power transistor may be biased to conduct between said first electrode and said second electrode; and
    means responsively coupled to said biasing means for determining whether said biasing means will bias said power transistor to conduct between said first electrode and said second electrode.

2. A digital data bus driver circuit according to claim 1 wherein said determining means comprises:
    a register having a binary bit position whereby a predetermined binary state of said binary bit position determines when said biasing means will bias said power transistor to conduct between said first electrode and said second electrode.

3. A digital data bus driver circuit comprising:
    a TTL tri-state bus driver;
    a power supply having an output capable of powering said TTL tri-state bus driver;
    a power transistor having a first electrode coupled to a power connection of said TTL tri-state bus driver and having a second electrode coupled to said output of supply;
    means responsively coupled to said power transistor for biasing said power transistor whereby said power transistor may be biased to conduct between said first electrode and said second electrode; and
    means responsively coupled to said biasing means for determining whether said biasing means will bias said power transistor to conduct between said first electrode and said second electrode.

4. A digital data bus driver circuit according to claim 3 wherein said determining means comprises:
   a register having a binary bit position whereby a predetermined binary state of said binary bit position determines when said biasing means will bias said power transistor to conduct between said first electrode and said second electrode.

5. A method of isolating an ECL tri-state bus driver from a digital data bus, comprising:
   setting a binary bit in a register to a predetermined value; and
   biasing a power transistor in response to said setting step to cause said power transistor to remove the ground path from said ECL tri-state bus driver.

6. A method of isolating a TTL tri-state bus from a digital data bus comprising:
   setting a binary bit in a register to a predetermined value; and
   biasing a power transistor in response to said setting step to cause said power transistor to remove power from said TTL tri-state bus driver.

* * * * *